United States Patent

Brown, Jr.

[11] 4,390,651
[45] Jun. 28, 1983

[54] PHENYL-CONTAINING ORGANOPOLYSILOXANES

[75] Inventor: Edgar D. Brown, Jr., Schenectady, N.Y.

[73] Assignee: General Electric Company, Waterford, N.Y.

[21] Appl. No.: 334,219

[22] Filed: Dec. 24, 1981

Related U.S. Application Data

[60] Continuation of Ser. No. 748,739, Dec. 9, 1976, which is a division of Ser. No. 506,007, Sep. 16, 1974.

[51] Int. Cl.$^3$ .............................................. C08K 5/54
[52] U.S. Cl. .................................. 524/267; 524/537; 525/464
[58] Field of Search ............................ 524/267, 537

[56] References Cited

U.S. PATENT DOCUMENTS

| | | | |
|---|---|---|---|
| 2,999,835 | 9/1961 | Goldberg | 260/42 |
| 3,028,365 | 4/1962 | Schnell et al. | 260/47 |
| 3,153,008 | 10/1964 | Fox | 260/47 |
| 3,632,794 | 1/1972 | Antonen | 260/46.5 R |
| 3,673,146 | 6/1972 | Factor | 260/37 PC |
| 3,751,519 | 8/1973 | Bostick et al. | 260/824 |

FOREIGN PATENT DOCUMENTS 653257 10/1947 United Kingdom .

Primary Examiner—John C. Bleutge
Assistant Examiner—Herbert J. Lilling
Attorney, Agent, or Firm—Hedman, Casella, Gibson, Costigan & Hoare

[57] ABSTRACT

Phenyl-containing organopolysiloxane fluids characterized by the formula,

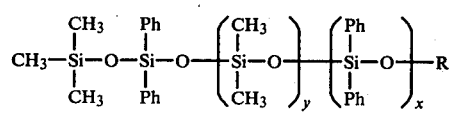

wherein Ph is phenyl, R is hydrogen, trimethylsilyl or mixtures thereof and wherein x and y have a value sufficient to provide a phenyl content of from about 7 weight percent to about 80 weight percent are provided. Also provided are polycarbonate compositions comprising these novel phenyl containing organopolysiloxane fluids.

4 Claims, No Drawings

PHENYL-CONTAINING ORGANOPOLYSILOXANES

This is a continuation of application Ser. No. 748,739, filed Dec. 9, 1976, which is a divisional application Ser. No. 506,007, filed on Sept. 16, 1974.

BACKGROUND OF THE INVENTION

This invention relates to organopolysiloxane polymers and more particularly to phenyl-containing organopolysiloxane fluid polymers.

In the past, there were three major types of silicone polymers which comprise nearly all of the phenyl-containing organopolysiloxanes. These included (1) those siloxanes with phenyl and methyl groups on the same silicon atom, (2) those siloxanes with two phenyls on one silicon and two methyls on the next or subsequent silicon atoms, and (3) those siloxanes containing phenyl tri units stopped with trimethyl units.

An example of the first type includes polymers of the structure

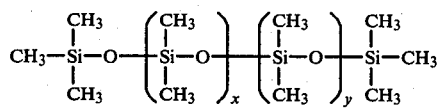

wherein Ph is phenyl and wherein, in general, $x = 0.05$ y to $y = 0$.

The second major type includes those polymers having the structure,

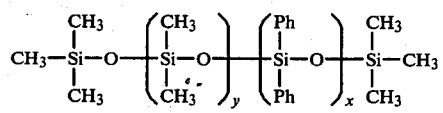

where Ph is phenyl and wherein, in general, $x = 0.05$ to $x = y$.

The third group of polymers has the structure

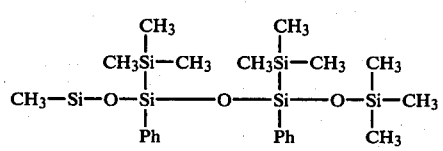

wherein the polymer length varies up to about 25 phenyl containing units.

For various reasons, these prior art silicone fluids are characterized with both technical and commercial problems. For example, the first of the above-identified silicone fluids are necessarily made from a starting material, i.e., methylphenyldichlorosilane, which comes from an expensive Grignard process while the polymers associated with the other above-identified classic structures are characterized with processing problems. For example, those polymers containing both diphenyl and dimethyl units have been found to be excessively volatile and moreover are difficult to manufacture in low viscosity form which is oftentimes desirable.

The uses for these hereinabove described silicone polymers are of course widespread, depending upon molecular weight and structure, and are well known. Included among these uses are, for example, lubricity additives for plastics, high temperature grease components and general mechanical fluids.

More specifically, one recently significant use of phenyl-containing organopolysiloxane fluids has been as internal mold release agents in polycarbonates. See, for example, U.S. Pat. No. 3,751,519. However, prior art phenyl organopolysiloxane fluids have not been totally satisfactory for polycarbonates as a result of their low solubility in the polycarbonate. Moreover, transparency usually desired in polycarbonate products is usually lost when these prior art phenyl-containing organopolysiloxane fluids are added thereto.

SUMMARY OF THE INVENTION

Accordingly, it is one object of this invention to provide a novel class of phenyl-containing organopolysiloxane fluids.

Another object of this invention is to provide novel phenyl-containing organopolysiloxane which are easily prepared in an economic manner.

Still another object of this invention is to provide novel phenyl-containing organopolysiloxane fluids having a high phenyl content, which, if desired, may be prepared in low viscosity form and which are characterized with low volatility.

Still another object of this invention is to provide phenyl-containing organopolysiloxane fluids, useful as internal mold release additives and having high solubility in polycarbonates.

A still further object of this invention is to provide novel phenyl-containing fluids of varied utilities, including additives for plastics, high temperature grease components, mechanical fluids and the like.

A still further object of this invention is to provide polycarbonate compositions comprising the novel phenyl organopolysiloxane fluids of this invention, said polycarbonate compositions being characterized with transparency and internal mold release properties.

These and other objects are accomplished herein by providing phenyl-containing organopolysiloxane fluid characterized by the following basic structure,

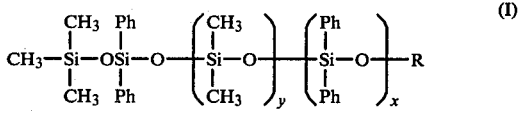 (I)

wherein x and y are values sufficient to provide a phenyl content of from about 7 weight percent to about 80 weight percent, and where Ph is phenyl, and wherein R is selected from the group consisting of hydrogen and trimethylsilyl, i.e.,

and mixtures thereof.

DETAILED DESCRIPTION OF THE INVENTION

The novel phenyl-containing organopolysiloxane fluids characterized by Formula I hereinabove are made by the solvent hydrolysis of diphenyldichlorosilane and dimethyldichlorosilane. In general, this solvent hydrolysis process involves preparing a blend of diphenyldichlorosilane, dimethyldichlorosilane, and a water-immiscible organic solvent.

Suitable organic solvents are, for example, any water-immiscible organic solvent which is inert to the hydrolysis reactants during hydrolysis, and in which the hydrolyzate is soluble so as to provide for its separation. More specifically, suitable organic solvents include benzene, toluene, xylene, and the like; esters such as butyl acetate, ethyl acetate and the like; and ethers such as diethyl ether, dioxane and the like. A preferred organic solvent is toluene. The amount of organic solvent employed may vary within a wide range and is generally within the range of from about 10% to about 50% by weight of the total weight of the blend of organohalosilanes, preferably about 25% by weight.

For purposes of this invention, the ratio of diphenylchlorosilane to dimethylchlorosilane in the organohalosilane blend which is subjected to hydrolysis is from about 1.5 to 1 to about 4 to 1 by weight, respectively. Preferably, the ratio of diphenylchlorosilane to dimethylchlorosilane is about 3 to 1.

The afore-described mixture of organohalosilanes in organic solvent is admixed with and agitated in water which has been preheated to from about 20° to about 85° C., preferably from about 60° to about 65°, the addition being carried out slowly over a period of, for example, from about 1 to about 2 hours, while maintianing a temperature of from about 60° C. to about 85° C., preferably from about 75° C. to about 85° C. The resultant hydrolysis mixture is allowed to settle and the aqueous acid layer (bottom) is separated and discarded. The remaining organic layer is generally washed several times with, for example, 15% sodium sulfate solution, until the HCl content is below about 10 parts per million. At this point, the water is azeotropically removed from the hydrolysis mixture at a temperature which should not exceed about 115° C. The material remaining, hereinafter referred to as the hydrolyzate, is a mixture of linear siloxanes (chainstopped with diphehyl silanol units), cyclic polymers, and organic solvent.

The hydrolyzate is then saturated with anhydrous ammonia and trimethylchlorosilane is slowly added thereto. The trimethylchlorosilane acts as a chainstopping agent and replaces the silanol groups with trimethylsiloxy chain-stopping units. The amount of trimethylchlorosilane which is employed varies with the amount of hydroxyl group replacement desired. For purposes of this invention, the trimethylchlorosilane is employed in amounts from about 9.5 to 25.5 weight percent of the weight of the hydrolyzate. More specifically, for polycarbonate additive purposes, the amount of trimethylchlorosilane chainstopping agent used ranges from about 11.4% to 19% by weight of the total weight of the hydrolyzate, providing a trimethylsiloxy unit content for the fluid of from about 12 to about 21 percent by weight.

After agitating the mixture for about one hour, the mixture is washed with, for example, 15% sodium sulfate until essentially neutral and the aqueous bottom layer is separated and discarded. The remaining organic layer is washed with, for example, sodium sulfate, and the organic solvent and residual water is stripped under vacuum, e.g., 25 to 30 mm Hg. at about 150° C. The remaining phenyl-containing organopolysiloxane fluid is characterized by Formula I hereinabove, wherein x and y are values sufficient to provide a phenyl content of from about 40 to 80 weight percent and is especially well suited as an internal mold release additive for polycarbonates since the fluid is highly soluble in polycarbonates and moreover retains the desired transparency of the polycarbonates. In general, x and y have a value of from about 3 to 10 for this purpose.

To obtain particularly high phenyl content, low volatile organopolysiloxane fluids within the scope of the present invention, and which are particularly well suited as a base stock for all mechanical or hydraulic phenyl silicone fluids, the afore-described phenyl-containing organopolysiloxane fluid is totally chainstopped by employing a sufficient amount of trimethylchlorosilane to do the same. The substantially all trimethylsiloxy chainstopped fluid is then subjected to an equilibration process involving admixing the same with potassium hydroxide and heating to about 180° C. for about 1 to 2 hours. If desired, additional trimethylsiloxy chainstepping units may be added during equilibration. Stripping the mixture at about 250°-300° C. under high vacuum (3-5 mm Hg.) results in a high phenyl content, low volatile, organopolysiloxane fluid characterized by Formula I above wherein x is about 3 to 10 and y is about 3 to 10 and the phenyl content is from about 40 to 80 weight percent.

To obtain phenyl-containing organopolysiloxane fluids within the scope of this invention and which are especially suitable as mechanical fluids and high temperature grease components the afore-described hydrolysis process for preparing the polycarbonate additive is continued by completely chainstopping the fluid by the addition of a sufficient quantity of trimethylchlorosilane. The resultant mixture is equilibrated with potassium hydroxide at a temperature in the range of from about 180° C. to 200° C. for about one hour. During equilibration octamethylcyclotetrasiloxane and trimethylsiloxy containing units provided, for example, by linear decamethyltetrasiloxane, are added in sufficient quantity to reduce the phenyl content to a desired amount, generally in the range of from about 38 to 48 weight percent, and to a desired viscosity, generally 100 to 200 centistokes at 25° C. In the preferred method of equilibration, the octamethyltetracyclosiloxane and trimethylsiloxy unit material are equilibrated first, then the phenyl-containing stock is added and the equilibration continued for like about 3 hours.

The resultant equilibrate is stripped to about 280° C. under very high vacuum, e.g., 3-5 mm Hg.

To obtain a fluid especially useful for transparent greases and controlled density greases, the fluid identified hereinabove, as being particularly useful as an internal mold release agent for polycarbonates, is further modified by the addition thereto of octamethylcyclotetrasiloxane (sufficient to lower the phenyl content to about 30 weight percent) and equilibrating and stripping the resultant mixture as described hereinabove.

It is clear to those skilled in the art that the phenyl-containing organopolysiloxanes of this invention as particularly characterized by Formula I hereinabove are particularly distinguished over the prior art phenyl-containing silicone fluids in that the present fluids comprise trimethylsiloxy chainstopping units which are directly attached primarily to diphenylsiloxy units. This accounts for the advantageous solubility properties of the present fluids in polycarbonates, in addition to accounting for the other advantageous properties herebefore described.

The polycarbonates which are contemplated herein in admixture with the above-identified internal mold release phenyl-containing organopolysiloxane additives of this invention include those aromatic polycarbonates prepared by reacting a dihydric phenol and a carbonate precursor. The reaction mixture can also include minor amounts of other additives or other amounts of other reactive nomomeric constituents. It can also include copolymers of two or more different dihydric phenols.

Specifically, examples of dihydric phenols that can be employed to prepare the polycarbonates contemplated herein are bis(4-hydroxyphenyl)-methane,2,2-bis(4-hydroxyphenylpropane, 2,2-bis(4-hydroxy-3-methyl-phenyl)-propane, 4,4-bis(4-hydroxyphenyl)-heptane, 2,2-bis(4-hydroxy, 3,5-dichlorophenyl)-propane, 2,2-bis(4-hydroxy-3,5-dibromophenyl)-propane, etc.; dihydric phenol ethers such as bis(4-hydroxyphenyl)-ether, bis(3,5-dichloro-4-hydroxyphenyl)-ethyer, etc.; dihydroxydiphenyls such as p,p'-dihydroxy-diphenyl, 3,3'-dichloro-4,4'-dihydroxydiphenyl, etc.; dihydroxyaryl sulfones such as bis(4-hydroxyphenyl)-sulfone, bis(3,5-dimethyl-4-hydroxyphenyl)-sulfone, etc.; dihydroxy benzenes, resorcinol, hydroquinones, halo and alkyl-substituted dihydroxy benzenes such as 1,4-dihydroxy-2-chlorobenzene, 1,4-dihydroxy-2,5-dichlorobenzene, 1,4-dihydroxy-3-methylbenzene, etc.; and dihydroxy diphenyl sulfoxides such as bis(4-hydroxyphenyl)-sulfoxide, bis(3,5-dibromo-4-hydroxyphenyl)-sulfoxide, etc. A variety of additional dihydric phenols are also available to provide carbonate polymers and are disclosed in U.S. Pat. Nos. 2,999,835, 3,028,365 and 3,153,008. It is, of course, possible to employ two or more different dihydric phenols or a copolymer of a dihydric phenol with glycol or with hydroxy or acid terminated polyester, or with a diboric acid in the event a carbonate copolymer or interpolymer rather than a homopolymer is desired for use in the preparation of the aromatic carbonate polymers of this invention.

Among the carbonate precursors employed in the afore-described polycarbonate preparation are included phosgene, dibromo and diiodocarbonyls as well as the bishaloformates of dihydric phenols (e.g., bischloroformates of hydroquinone, bisphenol-A, etc.) or glycols (e.g., bischloroformates or ethylene glycol, neopentyl glycol, polyethylene glycol, etc.)

A preferred aromatic polycarbonate within the scope of this invention is prepared from the reaction of phosgene and 2,2,bis(4-hydroxyphenyl) propane), commonly referred to as bisphenol A.

The preparation of the polycarbonate is generally carried out in the presence of an acid acceptor which may be either an organic or an inorganic compound. A suitable organic acid acceptor is a tertiary amine and includes materials such as pyridine, triethylamine, dimethylaniline, tributylamine, etc. The inorganic acid acceptor may be one which can either be a hydroxide, a carbonate, a dicarbonate or a phosphate or an alkali or alkaline earth metal.

Molecular weight regulations may also be employed in the preparation of the polycarbonate, such as phenol, cyclohexanol, methanol, para-tertiary-butylphenol, parabromophenol. Para-tertiary-butylphenol is preferred.

The phenyl-containing organopolysiloxane fluids of this invention, as identified by Formula I hereinabove, can be readily mixed in any convenient manner with the aromatic polycarbonate. Because the phenyl-containing organopolysiloxane fluids of this invention are compatible with and highly soluble in the polycarbonate material, thorough mixing is easily accomplished with no difficulty of separation. Thus, when preparing injection molded pellets, the polycarbonate and the siloxane can be either premixed or fed independently to feed hopper of an extruder.

Small amounts of the present phenyl-containing organopolysiloxanes achieve excellent results of mold release during the molding of the composition. The amount of siloxane used is generally from about 0.01 to about 2.0 weight percent based on the weight of the polycarbonate, and preferably from about 0.1 to about 1.0 weight percent thereof. The desired polycarbonate transparency is not lost by the presence of the present phenyl-containing organopolysiloxane.

In order that those skilled in the art may better understand how to practice the present invention, the following examples are given by way of illustration and not by way of limitation.

EXAMPLE 1

This example illustrates the preparation of a phenyl-containing organopolysiloxane fluid within the scope of Formula I of this invention especially well suited as an internal mold release agent for aromatic polycarbonates.

There are blended in a vessel 57.7 parts by weight diphenyldichlorosilane, 19.2 parts by weight dimethyldichlorosilane and 23.1 parts by weight toluene. Water in an amount which is about 1½ times the total weight of the organohalosilane weight is heated to about 60° C. to 61° C. in a separate vessel. The blend of organohalosilanes and toluene is slowly added to the water over a period of about 1½ hours with agitation and maintaining the temperature at about 75°–85° C. The hydrolysis mixture is stirred for an additional ½ hour after the addition is complete. The bottom aqueous acid layer is separated and discarded. The organic layer is washed two times with 15% sodium sulfate and checked for HCl acid content which should be below 10 parts per million water. The water is azeotropically removed at a temperature which does not exceed 115° C. To the remaining hydrolyzate is added sufficient anhydrous ammonia to saturate the hydrolyzate and 12.7 parts by weight trimethylchlorosilane, in that order. Care is taken not to lose any ammonia. The mixture is stirred for about one hour at 55° C. and then washed with water to remove ammonium chloride. The aqueous acid bottom layer is separated and discarded. The organic layer is washed with 15% sodium sulfate, until essentially neutral and the residual water and toluene is stripped at about 150° C. under a vacuum of about 25–30 mm Hg. The remaining phenyl-containing organopolysiloxane is characterized by the structure of Formula I hereinabove and has a phenyl content of 68.85% by weight and the trimethylsiloxy content is 16% by weight. This material is extremely well suited as a polycarbonate internal mold release agent.

EXAMPLE 2

This example illustrates the preparation of a phenyl-containing organopolysiloxane fluid within the scope of Formula I hereinabove which is particularly well suited as a component for high temperature and as a mechanical fluid.

To 56.65 parts by weight of the phenyl-containing organopolysiloxane fluid prepared in Example 1 is added about 1.6 parts by weight of decamethyltrisiloxane chainstopper and 41.8 parts by weight octatetramethylcyclosiloxane. 600 parts per million of potassium hydroxide pellets are added to the reaction vessel and the resultant admixture is equilibrated at 180° C. for about three hours. The reaction mixture is stripped up to about 280° at high vacuum, e.g., 3 to 5 mm Hg. The remaining phenyl-containing organopolysiloxane fluid is characterized by Formula I hereinabove and has a phenyl content of 39 percent by weight and a trimethylsiloxy content of 18 percent by weight.

EXAMPLE 3

This example illustrates the preparation of a phenyl-containing organopolysiloxane fluid within the scope of Formula I hereinabove which is particularly well suited as a transparent grease component.

To 42.4 parts of the phenyl-containing fluid prepared in Example 1 is added 57.6 parts of octamethylcyclotetrasiloxane and 600 parts per million of potassium hydroxide pellets. The mixture is equilibrated by heating to 180° C. for two hours and the refractive index is adjusted by increasing or decreasing the amount of phenyl content by adding octamethylcyclotetrasiloxane or the phenyl containing fluid. When the desired refractive index is achieved, the mixture is cooled to 40° C., Fuller's earth is added and the resultant mixture is filtered through Celite 545 (diatomaceous earth sold by Johns-Manville). The mixture is stripped off at a temperature of about 250° C. under high vacuum conditions, e.g., 3 mm Hg., leaving the desired transparent greast component which is characterized by Formula I hereinabove and has a 30 weight percent phenyl content.

EXAMPLE 4

This example illustrates the preparation of a phenyl-containing organopolysiloxane within the scope of Formula I hereinabove which is characterized with low volatility and high phenyl content.

The same procedure as in Example 1 is followed except that 9 parts by weight of trimethylchlorosilane is added to the hydrolyzate in order to completely chainstop and replace substantially all the silanol units with trimethylsiloxy units. The total chainstopped material is then equilibrated with potassium hydroxide and stripped such as is done in Example 1. The resultant material has a phenyl content of 65 weight percent and demonstrates only an 8% weight loss after being heated at 250° for 24 hours.

EXAMPLE 5

This example illustrates the preparation of a polycarbonate composition within the scope of this invention.

To 99 parts by weight of a polycarbonate prepared by reacting essentially equimoles of bisphenol A, i.e., (2,2-bis(4-hydroxyphenyl)propane) and phosgene in the presence of an acid acceptor and a catalyst, which polycarbonate has an intrinsic viscosity of about 0.50, is added 1 part by weight of the phenyl-containing organopolysiloxane of Example 1. The mixture is fed to an extruder and pelletized. The pellets are then injection molded into discs of about 3 inches in diameter and about ⅛ inch thick. The molded disc is easily released from the mold without sticking and the molded piece is transparent.

Obviously, other modifications and variations of the present invention are possible in light of the above teachings. It is therefore to be understood that changes may be made in the particular embodiments of this invention which are within the full intended scope of the invention as defined by the appended claims.

What is claimed and desired to be secured by Letters Patent is:

1. A polycarbonate composition comprising in admixture an aromatic polycarbonate and a phenyl-containing organopolysiloxane fluid characterized by the general formula:

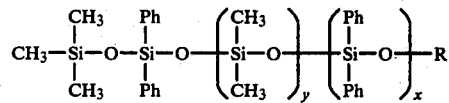

wherein Ph is phenyl, wherein x and y have a combined value sufficient to provide a phenyl content of from about 40 to about 80 percent by weight, and R is a mixture of hydrogen and trimethylsilyl sufficient to provide the fluid with a trimethylsiloxy content of from about 12 to 21 percent by weight.

2. A polycarbonate composition according to claim 1 wherein the phenyl containing organopolysiloxane is present in an amount of from about 0.01 to about 2.0 percent by weight based on the weight of the polycarbonate.

3. A polycarbonate composition according to claim 1 wherein the aromatic polycarbonate is the reaction product of phosgene and 2,2-bis(4-hydroxyphenyl)propane.

4. A polycarbonate composition according to claim 3 wherein the phenyl containing organopolysiloxane has a phenyl content of about 68 percent by weight and a trimethylsiloxy content of about 16 percent by weight.

* * * * *

UNITED STATES PATENT AND TRADEMARK OFFICE
CERTIFICATE OF CORRECTION

PATENT NO. : 4,390,651
DATED : June 28, 1983
INVENTOR(S) : Edgar D. Brown, Jr.

It is certified that error appears in the above—identified patent and that said Letters Patent is hereby corrected as shown below:

Correct the formula at column 1, line 25, so that it appears as follows:

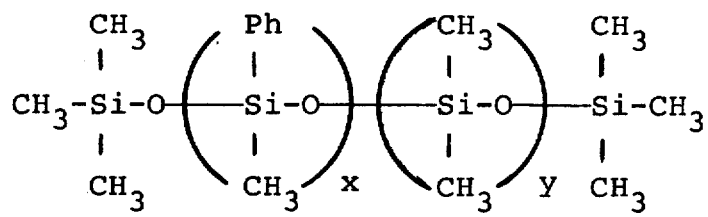

Signed and Sealed this

Thirtieth Day of October 1984

[SEAL]

Attest:

Attesting Officer

GERALD J. MOSSINGHOFF

Commissioner of Patents and Trademarks